(12) United States Patent
Tomikawa et al.

(10) Patent No.: US 9,303,230 B2
(45) Date of Patent: Apr. 5, 2016

(54) SLIDING MEMBER AND SLIDING MATERIAL COMPOSITION

(75) Inventors: Takashi Tomikawa, Toyota (JP); Toshiyuki Chitose, Toyota (JP)

(73) Assignee: TAIHO KOGYO CO., LTD., Aichi-Ken (JP)

(*) Notice: Subject to any disclaimer, the term of this patent is extended or adjusted under 35 U.S.C. 154(b) by 0 days.

(21) Appl. No.: 14/344,358

(22) PCT Filed: Sep. 13, 2012

(86) PCT No.: PCT/JP2012/073525
§ 371 (c)(1),
(2), (4) Date: Mar. 12, 2014

(87) PCT Pub. No.: WO2013/039177
PCT Pub. Date: Mar. 21, 2013

(65) Prior Publication Data
US 2015/0018255 A1    Jan. 15, 2015

(30) Foreign Application Priority Data
Sep. 13, 2011 (JP) .................. 2011-199559

(51) Int. Cl.
*F16C 33/20*       (2006.01)
*C10M 169/06*     (2006.01)
(Continued)

(52) U.S. Cl.
CPC ........... *C10M 169/04* (2013.01); *C10M 141/08* (2013.01); *F16C 33/043* (2013.01); *F16C 33/121* (2013.01); *F16C 33/203* (2013.01); *C10M 2201/041* (2013.01); *C10M 2201/061* (2013.01); *C10M 2201/062* (2013.01); *C10M 2201/065* (2013.01); *C10M 2201/066* (2013.01); *C10M 2201/085* (2013.01); *C10M 2213/062* (2013.01); *C10M 2217/0443* (2013.01); *C10N 2210/03* (2013.01); *C10N 2210/06* (2013.01); *C10N 2210/08* (2013.01); *C10N 2220/082* (2013.01); *C10N 2230/06* (2013.01); *C10N 2250/121* (2013.01); *F16C 2202/54* (2013.01);
(Continued)

(58) Field of Classification Search
CPC .................. C10M 2201/066; C10M 2201/084
USPC ................................... 508/108, 168
See application file for complete search history.

(56) References Cited

U.S. PATENT DOCUMENTS

2007/0004598 A1    1/2007 Maeda
2007/0021544 A1*   1/2007 Yanase et al. ............... 524/423

FOREIGN PATENT DOCUMENTS

EP    2194101 A1    6/2010
EP    2426190 A1    3/2012
(Continued)

OTHER PUBLICATIONS

International Search Report (PCT/ISA/210) issued Dec. 25, 2012, in corresponding Application No. PCT/JP2012/073525.
(Continued)

*Primary Examiner* — Vishal Vasisth
(74) *Attorney, Agent, or Firm* — Sughrue Mion, PLLC

(57) ABSTRACT

An object of the present invention is to provide a sliding member suitable to a soft mating member low in hardness. The present invention relates to a sliding member for sliding with a mating member having a ferrite phase at least on a surface thereof, the sliding member including a coating layer containing a binder resin, molybdenum disulfide, and hard substance particles.

3 Claims, 1 Drawing Sheet

(51) Int. Cl.
*C10M 169/04* (2006.01)
*F16C 33/04* (2006.01)
*C10M 141/08* (2006.01)
*F16C 33/12* (2006.01)

(52) U.S. Cl.
CPC ......... *F16C 2208/02* (2013.01); *F16C 2240/54* (2013.01)

(56) References Cited

FOREIGN PATENT DOCUMENTS

| | | |
|---|---|---|
| JP | 55-120633 A | 9/1980 |
| JP | 10-037962 A | 2/1998 |
| JP | 2001-31906 A | 2/2001 |
| JP | 2002-053883 A | 2/2002 |
| JP | 2003-254014 A | 9/2003 |
| JP | 2004-149622 A | 5/2004 |
| JP | 2006-045463 A | 2/2006 |
| JP | 4004631 B2 | 11/2007 |
| WO | 2010126035 A1 | 11/2010 |

OTHER PUBLICATIONS

Written Opinion (PCT/ISA/237) issued Dec. 25, 2012, in corresponding Application No. PCT/JP2012/073525.
Communication dated May 7, 2015 issued by European Patent Office in counterpart European Application No. 12831115.6.
Communication from the Japanese Patent Office dated Sep. 8, 2015 in a counterpart Japanese application No. 2013-533721.

* cited by examiner

SLIDING MEMBER AND SLIDING MATERIAL COMPOSITION

This application is a 371 of PCT/JP2012/073525, filed Sep. 13, 2012.

TECHNICAL FIELD

The present invention relates to a sliding member and a sliding material composition suitable to a soft mating member.

BACKGROUND ART

Conventionally, in order to supply lubrication to sliding sections of machinery, a surface of each sliding member is coated with a sliding material composition which is to be functioning as a lubricating film in each sliding section. Hence, it is required that the sliding material composition of this kind should be a lubricating film having low friction characteristic, excellent wear resistance so as not to wear out even after a long period of use, and good in fitness with a mating member.

A sliding material composition containing a wear-resistant agent, a solid lubricant, and a resin binder is known as the conventional sliding material composition (see Patent Documents 1 to 3).

CITATION LIST

Patent Literature

Patent Document 1: Japanese Patent No. 4004631
Patent Document 2: JP-A-H10-37962
Patent Document 3: JP-A-2002-53883

DISCLOSURE OF THE INVENTION

Problems to be Solved by the Invention

In the above-described conventional techniques, mating members to mate with sliding members are mating members having high hardness characteristic, which are obtained by being subjected to heat treatments such as chilling treatment or quenching treatment, and the conventional sliding material compositions are limited to the sliding material compositions configured on the assumption that the mating members are high hardness type. However, in recent years, development of shafts that are not subjected to hardening treatment has advanced in order to lower the manufacturing cost, and therefore, a demand becomes high for sliding members suitable to the mating members having lower hardness. An object of the present invention is to provide a sliding member that meets this demand.

Means for Solving the Problem

The present invention relates to a sliding member and a sliding material composition described hereinafter.

[1] A sliding member for sliding with a mating member having a ferrite phase at least on a surface thereof, the sliding member comprising: coating layer comprising a binder resin, molybdenum disulfide, and hard substance particles.

[2] The sliding member according to the above-described [1], wherein the hard substance particles have an average particle diameter that is 0.5 to 10 times as large as a surface arithmetic average roughness Ra of a sliding surface of the mating member.

[3] The sliding member according to the above-described [1] or [2], wherein the hard substance particles have a massive form.

[4] The sliding member according to any one of the above-described [1] to [3], wherein the hard substance particles have a hardness equal to or larger than 2 times as large as a hardness of the mating member.

[5] A sliding material composition for use in a sliding member for sliding with a mating member having a ferrite phase at least on a surface thereof, the sliding material composition comprising: a binder resin; molybdenum disulfide; and hard substance particles.

Advantageous Effects of Invention

According to the present invention, the sliding material composition and the sliding member that wrap a roughened portion of the mating member having the ferrite phase by sliding, thereby showing excellent wear resistance and seize resistance, can be provided.

BEST MODE FOR CARRYING OUT THE INVENTION

Figure 1:
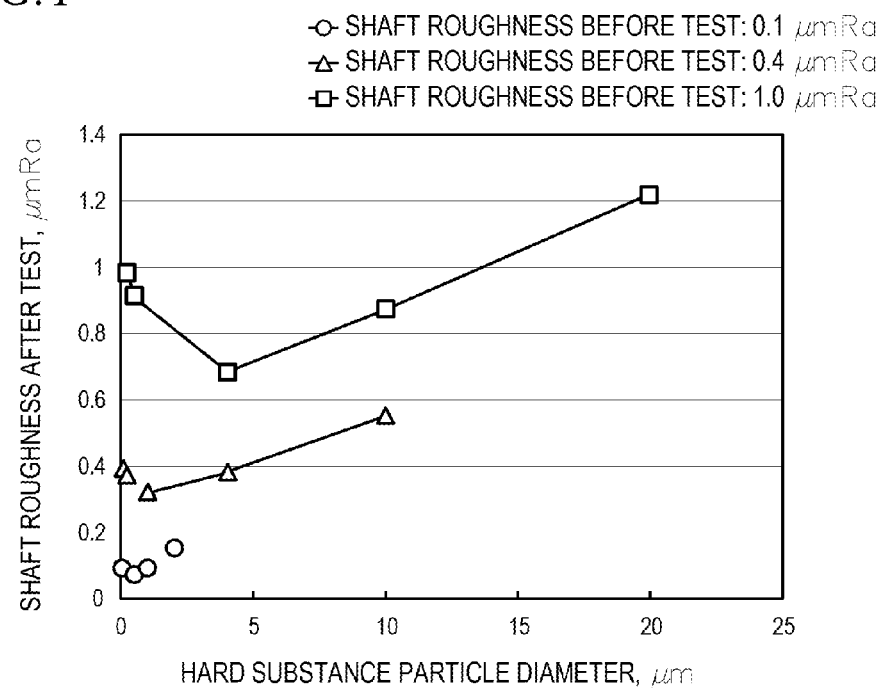
FIG. 1 is a graph showing relations between particle diameters of hard substance particles and surface roughness of mating shafts after wear tests.

A sliding material composition according to the present invention (hereinafter, also referred to as the "composition according to the present invention") contains a binder resin, molybdenum disulfide, and hard substance particles.

The binder resin defines a material that binds the composition according to the present invention, and is preferably at least one kind of resin selected from the group consisting of a polyamide-imide (PAI) resin, a polyimide resin, a phenolic resin, a polyacetal resin, a polyether ether ketone resin, and a polyphenylene sulfide resin. Among these resins, the polyamide-imide (PAI) resin is preferably used from the viewpoint of wear resistance.

The composition according to the present invention contains the hard substance particles. A ferrite phase is present in a mating member (also referred to as the "mating member") such as a forged shaft and a cast shaft that are not subjected to hardening treatment such as quenching treatment. The hardness of the mating member having this ferrite phase is HV200 to 300 in Vickers hardness, which is low, so that burrs are likely to be formed after abrasive finishing. A surface of a sliding bearing, that is, a sliding surface of a sliding member is softer than the ferrite phase, which is likely to cause abrasive wear with the burrs. In order to solve this problem, an action to shave the burrs formed in the ferrite phase to smooth the mating member surface, as it is called a wrapping effect, is imparted by the hard substance particles that are contained in the sliding material composition, whereby wear resistance and seizure resistance are improved in the present invention.

It is necessary to adjust the particle diameter of the hard substance particles in accordance with the surface roughness of the mating member in order to exert the wrapping effect.

Here, if a hard substance that is rough with respect to the surface roughness is added, the hard substance adversely attacks the mating member. On the other hand, if a hard substance that is too small is added, the wrapping effect cannot be obtained. Therefore, an average particle diameter (mode diameter) of the hard substance particles may be preferably 0.5 to 10 times, and particularly preferably 2 to 5 times as large as an arithmetic average roughness (Ra) of the sliding surface of the mating member.

It is to be noted that when the surface roughness is specified by a ten-point average roughness (Rz), the following relational expression is to be followed.

Arithmetic average roughness$(Ra)$=½ to ⅓×ten-point average roughness$(Rz)$

In addition, the form of the hard substance particles is preferably a massive form or a spherical form, and the massive form is particularly preferable because the hard substance particles in massive form is higher in wrapping effect than the hard substance particles in spherical form. Here, the massive form means an irregular form that does not substantially contain projections equal to or smaller than 90°, and excludes forms such as spherical and acute angle forms that can be formed by processing. It is to be noted that the hard substance particles in acute angle form could attack the mating member, and thus is not preferable.

The hardness of the hard substance particles is not limited as long as the hard substance particles have sufficient hardness against the mating member having the ferrite phase; however, because the hardness of the mating member is HV200 to 300, the hardness of the hard substance particles is preferably equal to or larger than HV600, which is equal to or more than twice as large as the hardness of the mating member, and particularly preferably equal to or larger than HV800. It is to be noted that the hardness mean Vickers hardness (the same will apply hereinafter).

The type of the hard substance particles is not particularly limited. However, from the viewpoint of satisfying the above hardness, $Fe_3P$ (about HV800), $Al_2O_3$ (HV1500 or more), SiC (HV2000 or more), AlN (HV1000 or more) and the like can be preferably used.

In addition, the content of the hard substance particles in the composition according to the present invention is preferably 0.1 to 5% by volume, and particularly preferably 1 to 4% by volume. When the content is within the above range, hard substance particles have a wrapping effect with deterioration of the mating member being made low.

The molybdenum disulfide ($MoS_2$) functions as a solid lubricant to impart wear resistance in the composition according to the present invention. By adding the solid lubricant, wrapping by the hard substance particles becomes fine. Because especially the molybdenum disulfide shows an excellent lubricating effect in oil more than other solid lubricants, this effect can be especially exerted in oil.

The content of molybdenum disulfide in the composition according to the present invention is 30 to 70% by volume, and preferably 35 to 60% by volume. When the molybdenum disulfide content is within the above range, a sufficient lubricating effect can be obtained.

It is to be noted that that the molybdenum disulfide preferably has an average particle diameter equal to or less than 5 µm, and particularly preferably equal to or less than 3 µm.

The composition according to the present invention may contain a solid lubricant other than the molybdenum disulfide.

The other solid lubricant is preferably at least one kind of solid lubricant selected from the group consisting of graphite, polytetrafluoroethylene (PTFE), tungsten disulfide, mica, boron nitride, graphite fluoride, and fullerene. The content of these solid lubricants is preferably 5 to 35% by volume from the view point that these solid lubricants obtain a lubricating effect especially when oil runs out as auxiliaries to the molybdenum disulfide.

The composition according to the present invention may further contain an inorganic additive, and the inorganic additive is preferably at least one kind of inorganic additive selected from the group consisting of calcium carbonate, barium sulfate, and calcium phosphate. In addition, from the viewpoint of wear resistance, the content of inorganic additive in the composition is preferably 5 to 10% by volume.

The sliding material composition according to the present invention can be used for a coating layer of a base member surface of a sliding member. The sliding material composition according to the present invention is preferably used for coating on the sliding surface especially when a mating sliding member has a ferrite phase at least on its surface. Specific examples of the mating member described above include a forged shaft that is not quenched, a spherical graphitic cast iron shaft that is not quenched, and a forged shaft that is not nitrided.

The sliding member according to the present invention includes a base member, and a coating layer provided on the base member, and the coating layer is formed from the above-described sliding material composition according to the present invention.

The material for the base member of the sliding member according to the present invention is not particularly limited. However, it is preferable to select the material from the group consisting of steel, stainless steel, cast iron, copper, copper alloy, aluminum, aluminum alloy, rubber, plastics, and ceramics. In addition, the form of the base member is not particularly limited, and may be a plate shape or a tube shape. In addition, it is preferable that the base member includes a back steel such as steel and stainless steel, and an alloy layer disposed on the back steel and containing aluminum alloy, copper alloy or the like.

As a method for forming the coating layer, for example, a method for mixing the composition according to the present invention with a solvent of a binder resin, forming a film of the mixture on the base member surface using a known method such as air spray coating, and then firing the film at a firing temperature of the binder resin can be applied. In addition, the base member surface may be subjected to surface roughening treatment before the surface is coated, or an adhesion layer may be provided between the base member and the coating layer in order to strengthen the coating. The thickness of the coating layer is preferably 5 to 30 µm. The surface roughness of the coating layer is not particularly limited, but is preferably 0.3 to 3 µmRa.

The lubrication condition of the sliding member according to the present invention is not particularly limited, and any condition of oil lubrication, grease lubrication and no lubrication can be used.

EXAMPLES

Aluminum bimetallic base members (about 1.5 mm in thickens (0.2 mm in thickness in aluminum alloy layers)) were subjected to shot blasting treatment, and then the compositions shown in Table 1 were spray coated so as to have a thickness of 10 µm, and coating layers were formed. After the forming of the films by the spray coating, the members were fired at 200° C., and thus samples were produced. The used materials are as follows. It is to be noted that remainders other than the solid lubricants and the hard substances were adjusted using binder resins so that each composition was 100% by volume in total.

Binder resin
  Polyamide-imide (PAI) resin: manufactured by HITACHI CHEMICAL CO., LTD.
Solid lubricant
  Molybdenum disulfide: manufactured by SUMICO LUBRICANT CO., LTD., average particle diameter of 2 μm
  Graphite: manufactured by SUMICO LUBRICANT CO., LTD., average particle diameter of 2 μm
  Tungsten disulfide: manufactured by SUMICO LUBRICANT CO., LTD., average particle diameter of 2 μm
Hard substance particles
  $Al_2O_3$: manufactured by FUJIMI INCORPORATED CO., LTD., all in massive form (Wear Test)
The wear tests were performed using a partial contact wear tester under the following conditions.
  The number of revolutions: Cycle test of 0 rpm (1 minute holding)→1200 rpm (1 minute holding)→0 rpm (1 minute holding)
  Lubricating oil: 0 W-20
  Lubricating temperature: 100° C.
  Load: 4.41 kN
  Test time: 100 hours
(Surface Roughness Measurement)
Arithmetic average roughness (Ra) was measured in accordance with the JIS B 061 (2001).
(Wear Depth Measurement)
The thickness of the coating layers of the samples (bearings) was measured before and after the tests, and the wear depth was calculated from those values.

TABLE 1

| | | Shaft type | $MoS_2$ additive amount (% by volume) | Solid lubricant other than $MoS_2$ Type | Amount (% by volume) | Hard substance Type | Amount (% by volume) | Average particle diameter (μm) | Shaft roughness before test (μmRa) | Average particle diameter of hard substance particles/shaft roughness before test (times) | Shaft roughness after test (μmRa) | Bearing wear depth (μm) |
|---|---|---|---|---|---|---|---|---|---|---|---|---|
| Examples | 1 | Cast | 30 | — | — | $Al_2O_3$ | 1 | 0.05 | 0.1 | 0.5 | 0.09 | 2 |
| | 2 | Cast | 50 | — | — | $Al_2O_3$ | 3 | 0.5 | 0.1 | 5 | 0.07 | 1.4 |
| | 3 | Cast | 35 | PTFE | 35 | $Al_2O_3$ | 5 | 1 | 0.1 | 10 | 0.09 | 1 |
| | 4 | Cast | 30 | PTFE | 20 | SiC | 2 | 2 | 0.1 | 20 | 0.15 | 0.8 |
| | 5 | Cast | 60 | — | — | SiC | 4 | 0.1 | 0.4 | 0.25 | 0.39 | 6.3 |
| | 6 | Cast | 70 | — | — | SiC | 5 | 0.2 | 0.4 | 0.5 | 0.37 | 2.8 |
| | 7 | Cast | 30 | Gr | 20 | $Fe_3P$ | 3 | 1 | 0.4 | 2.5 | 0.32 | 2.2 |
| | 8 | Forged | 30 | Gr | 30 | $Fe_3P$ | 4 | 4 | 0.4 | 10 | 0.38 | 1.5 |
| | 9 | Forged | 40 | Gr | 5 | $Fe_3P$ | 5 | 10 | 0.4 | 25 | 0.55 | 1 |
| | 10 | Forged | 30 | $WS_2$ | 20 | AlN | 3 | 0.2 | 1 | 0.2 | 0.98 | 8.1 |
| | 11 | Forged | 40 | — | — | AlN | 2 | 0.5 | 1 | 0.5 | 0.91 | 3.7 |
| | 12 | Cast | 30 | $WS_2$ | 20 | AlN | 3 | 4 | 1 | 4 | 0.68 | 2.8 |
| | 13 | Cast | 35 | PTFE | 5 | $Al_2O_3$ | 5 | 10 | 1 | 10 | 0.87 | 2.1 |
| | 14 | Cast | 40 | $WS_2$ | 10 | SiC | 2 | 20 | 1 | 20 | 1.21 | 1.6 |
| Comparative Examples | 1 | Cast | — | PTFE | 50 | $Al_2O_3$ | 1 | 0.5 | 0.1 | 5 | 0.08 | 10.3 |
| | 2 | Cast | — | Gr | 50 | SiC | 2 | 1 | 0.4 | 2.5 | 0.36 | 6.8 |
| | 3 | Cast | — | $WS_2$ | 50 | $Fe_3P$ | 3 | 4 | 1 | 4 | 0.82 | 7.6 |
| | 4 | Forged | — | PTFE | 50 | AlN | 4 | 0.5 | 0.1 | 5 | 0.09 | 10.2 |
| | 5 | Forged | 20 | PTFE | 20 | — | — | — | 0.4 | — | 0.4 | 15.6 |
| | 6 | Forged | 50 | — | — | — | — | — | 0.4 | — | 0.38 | 11.3 |

Figure 2:
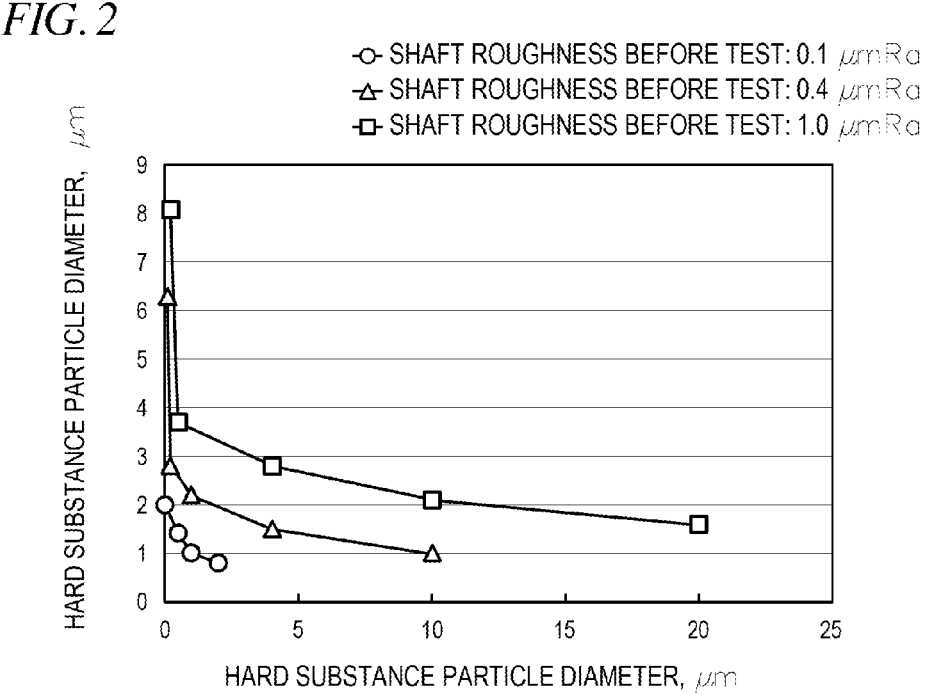
FIG. 2 is a graph showing relations between the particle diameters of hard substance particles and wear depth of samples (bearings) after wear tests.

SiC: manufactured by FUJIMI INCORPORATED CO., LTD., all in massive form
$Fe_3P$: manufactured by FUKUDA METAL FOIL & POWDER CO., LTD., all in massive form
AlN: manufactured by Toyo Aluminium K.K., all in massive form The samples (bearings) of the Examples and the Comparative Examples were subjected to wear tests by using cast shafts or forged shafts having ferrite phases on their sliding surfaces as mating members, and the surface roughness of the sliding surfaces of the mating shafts before and after the tests, and the wear depth of the sliding surfaces of the samples after the tests were measured. The results are shown in Table 1. In addition, with respect to the Examples, the relations between the particle diameters of the hard substance particles and the surface roughness of the mating shafts after the tests are shown in FIG. 1, and the relations between the particle diameters of the hard substance particles and the wear depth of the samples (bearings) after the tests are shown in FIG. 2. It is to be noted that each mating member was not subjected to hardening treatment such as quenching, and had a hardness of HV200 to 300.

It is evident from Table 1 that all the Examples are in good lubrication states. Meanwhile, it is determined from the comparison of Comparative Example 1 and Comparative Example 4, and Example 2 that the wear depth of the bearings becomes larger by containing the hard substance particles but not containing molybdenum disulfide. Similar tendencies are confirmed also from the comparison of Comparative Example 2 and Example 7, and the comparison of Comparative Example 3 and Example 12.

In addition, it is determined from the comparison of Comparative Example 5 and Example 7, and the comparison of Comparative Example 6 and Example 5 that the wear depth of the bearings becomes larger by containing the molybdenum disulfide but not containing hard substance particles.

In addition, it is evident from Table 1, and FIG. 1 and FIG. 2 that if the average particle diameters of the hard substance particles are 0.5 to 10 times as large as the surface arithmetic average roughness Ra of the sliding surfaces of the mating members (the shaft roughness before the tests), both of the shaft roughness and the wear depth of the bearings after the tests can be reduced, whereby wrapping effects can be exerted, which is preferable.

The present invention has been described in detail with reference to the specific embodiment. However, it will be obvious to those skilled in the art that various changes and modifications may be made without departing from the spirit and scope of the present invention. The present application is based on the Japanese Patent Application filed on Sep. 13, 2011 (P2011-199559), and the contents thereof are incorporated herein by reference.

The invention claimed is:

1. A sliding member for sliding with a mating member having a ferrite phase at least on a surface thereof, the sliding member comprising:
   a coating layer comprising a binder resin, molybdenum disulfide, and hard substance particles which have an average particle diameter that is 0.5 to 10 times as large as a surface arithmetic average roughness Ra of a sliding surface of the mating member,
   wherein the hard substance particles have a massive form, and
   wherein the massive form is an irregular form that does not substantially contain projections equal to or smaller than 90°, and excludes forms such as spherical and acute angle forms that can be formed by processing.

2. The sliding member according to claim 1,
   wherein the hard substance particles have a hardness equal to or larger than 2 times as large as a hardness of the mating member.

3. A sliding material composition for use in a sliding member for sliding with a mating member having a ferrite phase at least on a surface thereof, the sliding material composition comprising:
   a binder resin;
   molybdenum disulfide; and
   hard substance particles which have an average particle diameter that is 0.5 to 10 times as large as a surface arithmetic average roughness Ra of a sliding surface of the mating member,
   wherein the hard substance particles have a massive form, and
   wherein the massive form is an irregular form that does not substantially contain projections equal to or smaller than 90°, and excludes forms such as spherical and acute angle forms that can be formed by processing.

* * * * *